US008650500B2

(12) United States Patent
Soderberg et al.

(10) Patent No.: US 8,650,500 B2
(45) Date of Patent: Feb. 11, 2014

(54) COPY-AND-PASTE FUNCTIONALITY FOR NETWORK RECONFIGURATION

(75) Inventors: Eric Martin Soderberg, Mountain View, CA (US); Jonathan Paul Patrizio, San Francisco, CA (US); Daniel W. Hepner, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2982 days.

(21) Appl. No.: 10/794,971

(22) Filed: Mar. 5, 2004

(65) Prior Publication Data
US 2005/0198581 A1 Sep. 8, 2005

(51) Int. Cl.
*G06F 3/048* (2013.01)
*G06F 15/177* (2006.01)

(52) U.S. Cl.
USPC ............ 715/770; 709/221; 709/223; 715/769

(58) Field of Classification Search
USPC ......... 709/220, 221, 223, 251, 253, 200, 222; 715/769, 770
See application file for complete search history.

(56) References Cited

U.S. PATENT DOCUMENTS

| 5,491,784 | A | * | 2/1996 | Douglas et al. | 715/810 |
| 5,495,607 | A | * | 2/1996 | Pisello et al. | 707/10 |
| 5,687,315 | A | * | 11/1997 | Tezuka et al. | 709/220 |
| 5,966,128 | A | * | 10/1999 | Savage et al. | 715/853 |
| 6,009,440 | A | * | 12/1999 | Watson et al. | 1/1 |
| 6,084,598 | A | | 7/2000 | Chekerylla | |
| 6,272,537 | B1 | * | 8/2001 | Kekic et al. | 709/223 |
| 6,556,220 | B1 | | 4/2003 | Hammond | |
| 6,847,384 | B1 | * | 1/2005 | Sabadell et al. | 345/672 |
| 7,185,075 | B1 | * | 2/2007 | Mishra et al. | 709/223 |
| 7,627,658 | B2 | * | 12/2009 | Levett et al. | 709/223 |
| 2002/0063734 | A1 | * | 5/2002 | Khalfay et al. | 345/744 |
| 2002/0191863 | A1 | * | 12/2002 | Biermann et al. | 382/285 |
| 2003/0212898 | A1 | | 11/2003 | Steele et al. | |
| 2005/0114479 | A1 | * | 5/2005 | Watson-Luke | 709/220 |
| 2005/0131938 | A1 | * | 6/2005 | Sabadell et al. | 707/103 R |
| 2005/0132282 | A1 | * | 6/2005 | Panditharadhya et al. | 715/516 |
| 2005/0198228 | A1 | * | 9/2005 | Bajwa et al. | 709/220 |
| 2006/0170677 | A1 | * | 8/2006 | Zhao et al. | 345/423 |
| 2007/0038610 | A1 | * | 2/2007 | Omoigui | 707/3 |
| 2009/0106680 | A1 | * | 4/2009 | Brownholtz et al. | 715/769 |

* cited by examiner

*Primary Examiner* — Krista Zele
*Assistant Examiner* — Tariq Najee-Ullah

(57) ABSTRACT

A network system includes a reconfigurable network and a network management system. The network management system can represent the network in the form of a network image. Network image objects, corresponding to network objects, can be selected as copy sources and paste targets. A copy-and-paste operation modifies the network image to indicate a potential modification of the actual network in which the configuration of the network object corresponding to the selected copy source object is applied to the network object corresponding to the selected image object. In addition, the copy-and-paste operation can automatically represent a common connection of a source object input and a target object input to a common data source. Furthermore, the copy-and-paste operation can automatically connect outputs of source and target objects to a comparison function so that the implementation of the copy-and-paste operation on the actual network can be validated.

17 Claims, 3 Drawing Sheets

COPY-AND-PASTE FUNCTIONALITY FOR NETWORK RECONFIGURATION

BACKGROUND OF THE INVENTION

The present invention relates to computers and, more particularly, to software-reconfigurable computer networks. A major objective of the invention is to reduce the likelihood of unplanned interruptions when expanding, upgrading, reallocating resources in, or otherwise modifying a computer network.

Increasingly, businesses compete to provide services (e.g., information, sales, and support) over the Internet. Large Internet businesses require extensive computing resources, which must be frequently expanded, upgraded, and reallocated to remain competitive in the rapidly evolving Internet environment. On the other hand, any change to a computing environment involves planned interruptions and risks unplanned interruptions. Such interruptions, especially if they are unplanned, can be quite costly to an Internet enterprise, as potential sales and even customers (who might have returned for future business but for the discouragement associated with the interruption) may be lost. The potential losses can discourage an enterprise from making changes needed to remain competitive.

Network management tools, e.g., OpenView, available from Hewlett-Packard Company, can provide for managing network upgrades, expansions, and reallocations, so that the likelihood of unplanned interruptions and the impact of planned interruptions are reduced. Network management software can provide a graphic representation of a network that can be manipulated by network management personnel to define network reconfigurations. The software can cooperate with certain hardware, e.g., software reconfigurable network switches for changing network connections and a server for distributing software to target computers of the network, to semi-automate network reconfiguration. This can save time and effort and reduce risk of error compared to manual reconfiguration involving changing physical cable connections and installing software locally.

While such management tools can minimize interruptions involved in implementing a given reconfiguration, there is still the problem that unexpected incompatibilities introduced by the reconfiguration might cause deleterious unplanned interruptions. What is needed is a system for reducing the risk of unplanned interruptions that can, thus, encourage an enterprise to reconfigure as needed to remain competitive.

SUMMARY OF THE INVENTION

The present invention provides copy-and-paste functionality for reconfiguring a computer network. A network management system displays a network image that is a graphical representation of the network. A user can specify potential modifications to the network by manipulating the network image. In particular, the user can implement a graphical copy-and-paste operation to apply the configuration of a selected source network object (e.g., computer) to a target network object. Once the graphical manipulations represent a desired modification of the network, the network management system can implement the modification, e.g., by automatically installing and activating software and setting network switches.

The invention provides for implementing the potential modification represented by the copy-and-paste result. However, the invention also provides for using the result of the copy-and-paste operation as a mere step in defining a desired network modification. For example, the copy-and-paste operation can provide a target image object that is a replica of a source image object, while subsequent modifications of the target image object can represent a desired upgrade. In the latter case, the modification implemented on the actual network is itself a modification of the copy-and-paste result.

The copy-and-paste operation can automatically represent a potential connection of inputs of the source and target objects to a common data source, e.g., so that, upon implementation, the target object receives the same data as does the source object. In addition, the copy-and-paste operation can automatically represent a potential connection of outputs of the source and the target objects to a comparison function so their data outputs can be compared. Where the result of the copy-and-paste operation is implemented directly, the comparison function can be used to confirm that the target object responds in the same manner as the source object respond. Where the result of the copy-and-paste operation is further modified before implementation, the comparison can be used to confirm compatibility and the realization of expected benefits from an upgrade.

Where the target object has an original configuration, the invention provides alternatives for the result of the copy-and-paste operation. In the first case, the original target configuration is deleted in favor of the source configuration. In the second case, the original target configuration is combined with the source configuration. Both cases can be implemented in response to a single copy-and-paste operation, e.g., applying the first for operating systems and network daemons and the second to applications.

The copy-and-paste functionality of the invention is analogous to that of copy-and-paste functionality in drawings and other programs. The various copy-and-paste techniques employed in drawing programs can also be applied in the context of the present invention. The invention offers the corresponding advantage: just as, in the context of a drawing program, a copy-and-paste operation obviates the need to redraw a source object in order to replicate it, a copy-and-paste operation of the invention obviates the need to configure a target object element-by-element to replicate a source object.

The invention contemplates the following method for upgrading a network. First, the network is represented in graphical form. Then a copy and paste operation is used to modify the graphical representation. Further graphical modifications are made corresponding to the upgrade being applied to the target object. Then the desired modification is implemented on the network. In the meantime, users continue to interact with the source object without interruption. The result of the reconfiguration is then tested by comparing the source and target outputs. If the tests are favorable, the network is reconfigured again so that the user interacts with the target object rather than the source object. Thus, in place testing is achieved with very little negative impact on users. These and other features and advantages of the invention are apparent from the description below with reference to the following figures.

DETAILED DESCRIPTION

Figure 1:
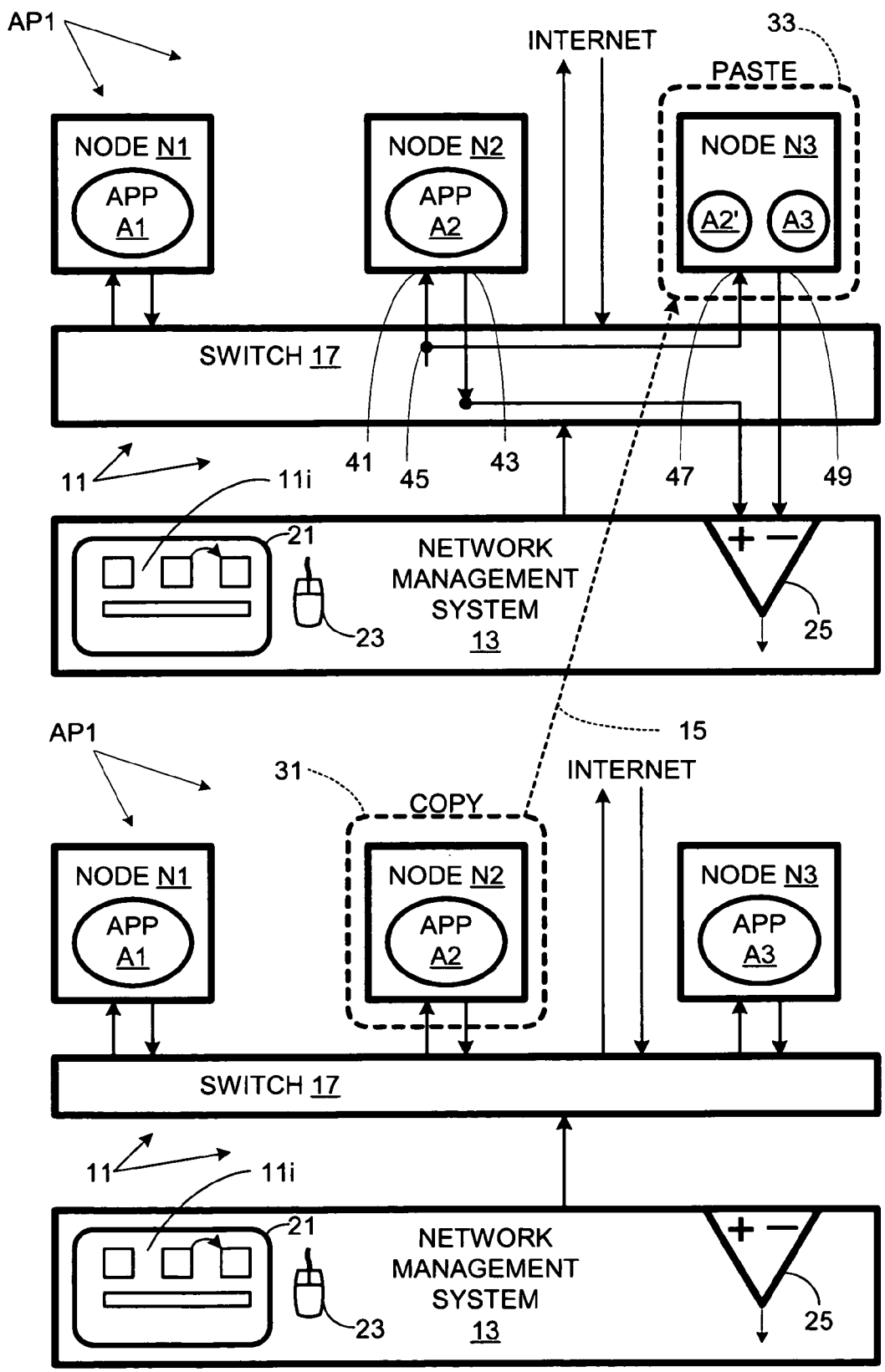
FIG. 1 is a schematic diagram showing the effect of a copy-and-paste operation as implemented on a computer network in accordance with the present invention.
Figure 2:
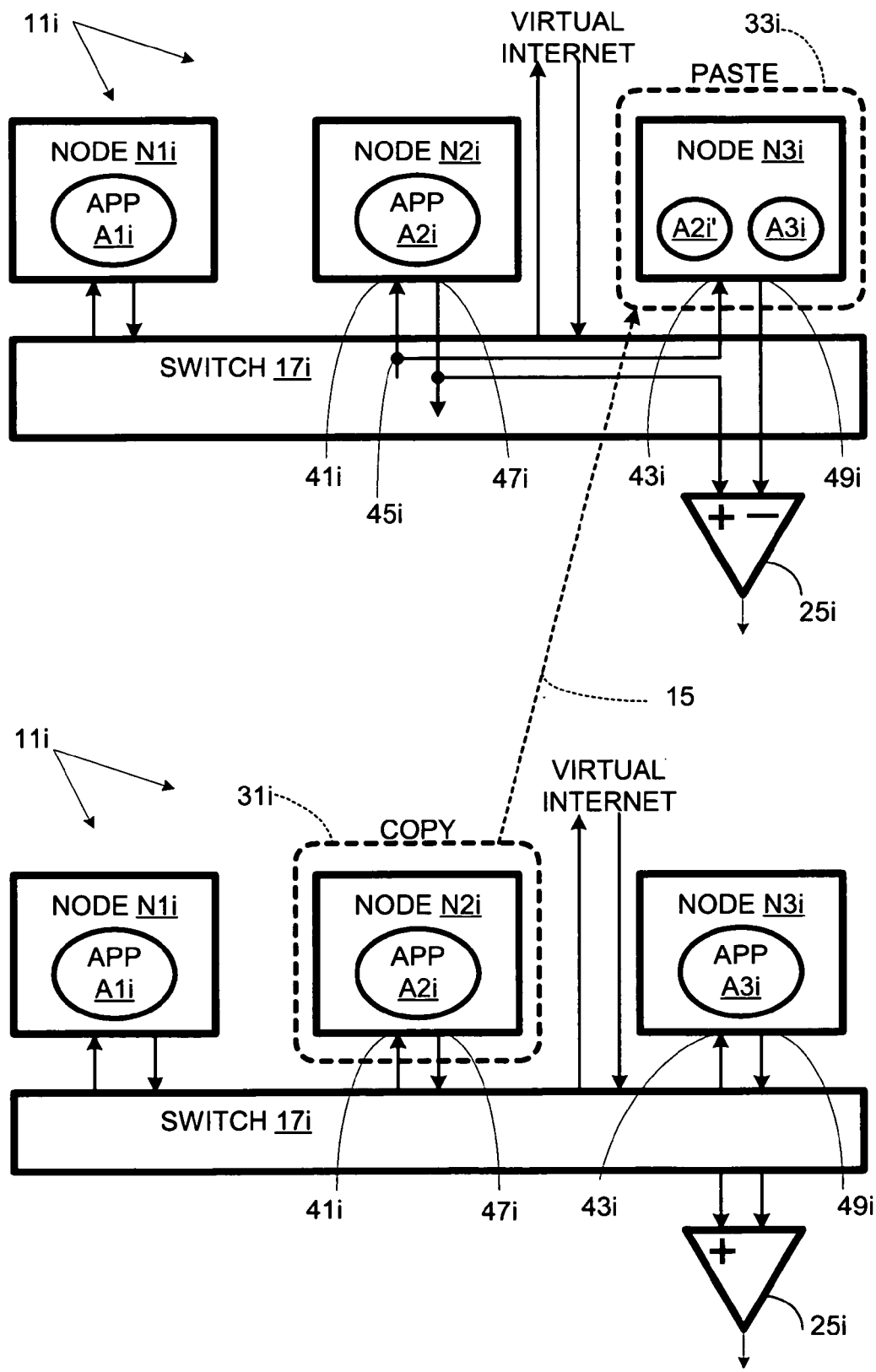
FIG. 2 is a schematic diagram showing the effect of a copy-and-paste operation on a network image represented the computer network of FIG. 1. (Note that an "i" at the end of a referent (e.g., network image 11i) indicates the corresponding graphic element corresponds to an image of the network element referred to by the same number (e.g., network 11).

A network system API, comprises a reconfigurable network 11 and a network management system 13, as shown in FIG. 1. In accordance with the present invention, network management system 13 provides for copy-and-paste functionality in generating potential modifications of network 11. FIG. 2 presents a network image 11i of network 11 before (below) and after (above) the copy-and-paste operation 15. FIG. 1 represents network 11 before (below) and after (above) the result of the copy-and-paste operation 15 is implemented on network 11.

Network 11 includes three computers, e.g., nodes N1, N2 and N3, and a software-controlled switch 17 through which the nodes communicate with each other, the Internet, and network management system 13. Applications A1, A2, and A3 are initially installed respectively on nodes N1, N2, and N3. Network management system 13 includes a display 21, a mouse pointing device 23, and a comparison function 25.

Network management system 13 can present a graphic representation of network 11 in the form of a network image 11i, in which image objects correspond to network objects. For example, node images N1i, N2i, and N3i of FIG. 2 represent actual nodes N1, N2, and N3 of FIG. 1, respectively; switch image 17i of FIG. 2 represents switch 17 of FIG. 1, and comparison function image 25i of FIG. 2 corresponds to comparison function 25 of FIG. 1. Application images A1i, A2i, and A3i of FIG. 2 respectively correspond to software applications A1, A2, and A3 of FIG. 1.

Network image 11i as shown in the lower portion of FIG. 2 shows application images A1i, A2i, and A3i initially within node images N1i, N2i, and N3i, respectively. This corresponds to the configuration of network 11 before copy-and-paste operation 15; in this configuration (shown at the bottom of FIG. 1), application A1 is installed on node N1, application A2 is installed on node N2, and application A3 is installed on node N3.

Using mouse 23 and display 21 of FIG. 1, a user can select a source object for a copy operation. As indicated by dotted rounded rectangle 31 in FIG. 2, a user has selected node image N2i as a copy-source image object. As indicated by the dotted rounded rectangle 33 of FIG. 2, the user has selected node image N3i as the paste-target image object. When the paste operation is executed, paste-target image object (node image N3i) is modified in that a version of application image A2i is now shown within node image N3i. This indicates a potential configuration of network 11 in which application A2 is installed on node N3.

Conveniently, network management system 13 can be configured so that operations that might typically follow a copy and paste operation are automatically executed with the copy-and-paste operation. Thus, in the illustrated example, executing copy-and-paste operation 15 connects a source input image 41i and a target input image 43i to a common data source image 45i. This represents a potential modification of network 11 in which node N3 receives the same input data as node N2. Also in the illustrated example, a source output image 47i and a target output image 49i are connected to comparison function image 25i. This represents a potential modification of network 11 in which outputs 47 and 49 of nodes N2 and N3 are provided to comparison function 25 so that the outputs can be compared (e.g., to validate the copy-and-paste implementation).

In this example, execution of copy-and-paste operation 15 does not affect the configuration of actual network 11. However, a user can choose to implement the network configuration represented by the copy-and-paste result. This can be useful to validate a copy-and-paste result before implementing other modifications required to achieve a desired end result.

When the implementation command is received from a user, network management system 13 issues the necessary commands so that application A2 is installed on node N3. In addition, input 43 and output 49 of node N3 are connected as indicated in the modified network image 11i in the upper portion of FIG. 2. To this end, network management system 13 can include an application server that provides a copy of application A2 to node N3, and can control switch 17 to effect the desired reconnections resulting in the network as represented in the upper portion of FIG. 1.

Figure 3:
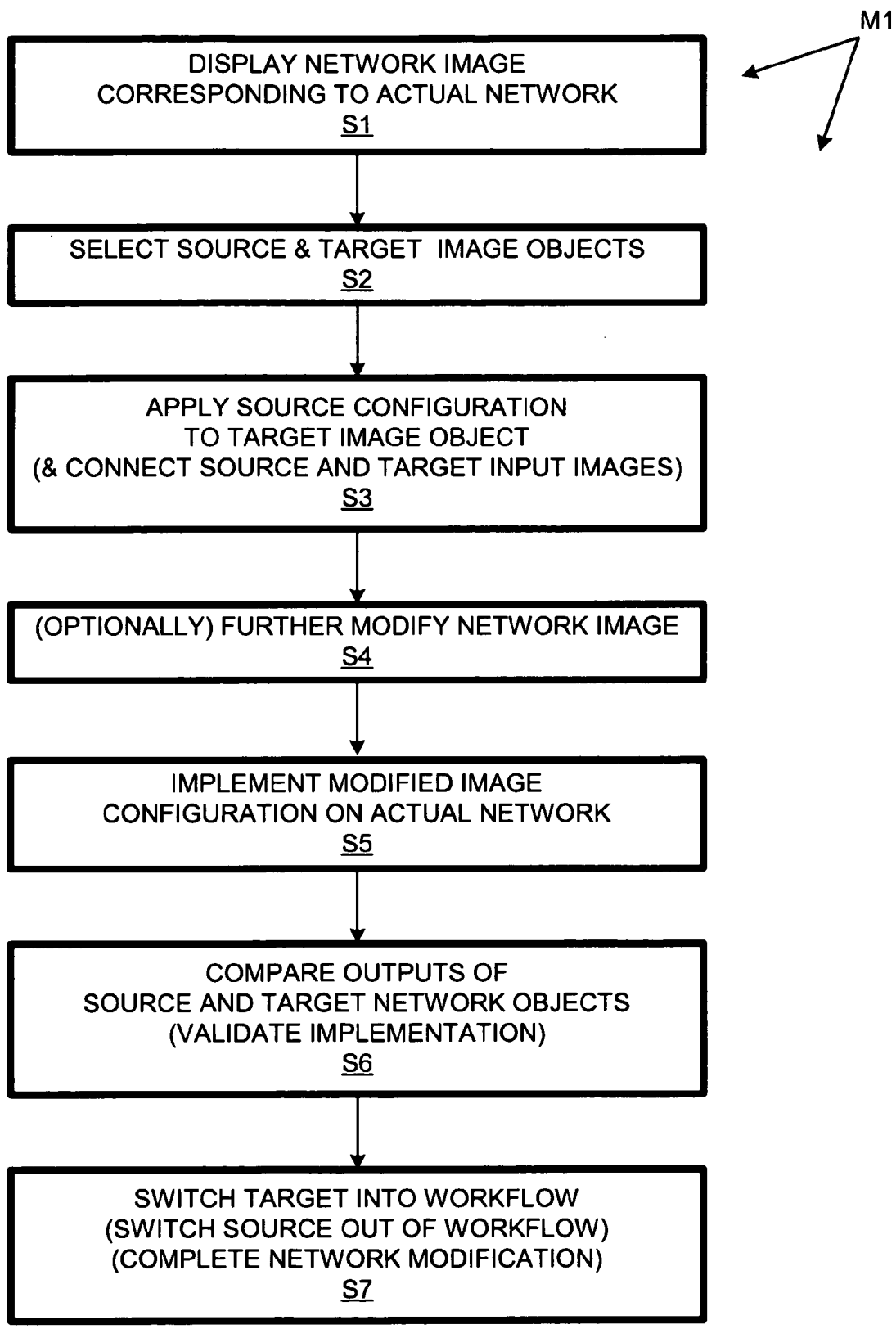
FIG. 3 is a flow chart of a method practiced on the actual network of FIG. 1 and the network image of FIG. 2.

A method M1 of the invention is flow-charted in FIG. 3. At step S1, network image 11i of network 11 in its original configuration is depicted on display 21. At step S2, the source image object (node image N2i) and target image object (node image N3i) are selected. In the illustrated embodiment, the source image object is selected first and the target image object is selected next, but the invention provides for selecting in the reverse order or concurrently. For example, the invention also provides for automatic selection of a suitable target image object image when a source image object is selected.

Step S3 involves executing copy-and-paste operation, which results in a modification of target object image corresponding to a potential modification of the corresponding target network object donning a configuration of the corresponding source network object. In the illustrated example, the source network object is node N2, and its configuration is that application A2 is installed thereon. The source object image is image object N2i, which includes application image object A2i. Copy-and-paste operation 15 results in a second instance of image object A2i being included in the post-paste version of target image object N3i.

Optional step S4 involves further modifying network image 11i before implementing a potential modification on network 11. For example, the target image object can be further modified to represent a desired upgrade to network 11. In the illustrated example, the second instance of application image A2i is modified to an upgraded version A2i' as shown in the upper portion of FIG. 2. Thus, FIG. 2 represents the transformation of network image 11i effected by steps S1-S4 of method M1. If step S4 is not implemented, the result would be similar except that image object A2i' would remain instead a second instance of image object A2i.

Step S5 involves implementing the potential configuration of network 11 represented by the network image resulting from the preceding steps of method M1. Typically, the potential configuration is represented by a currently displayed version of network image 11i. FIG. 1 represents the transformation of network 11 resulting from steps S1-S5 of method M1. Network management system 13 includes an application server for distributing applications as required by the reconfiguration. Also, network management system 11 can control switch 17 for the purpose of providing the indicated reconnections.

Step S6 involves comparing outputs of the source network object (e.g., node N2) and target network object (e.g., node N3) to validate the modification of network 11. For example, if step S4 is skipped, the outputs can be compared to determine whether the instance of application A2 on target node N3 provides the same results as the original instance of application A2 on source node N2. If step S4 results in a modification of application A2, the outputs can be compared to test whether any expected changes in the outputs are in fact realized.

Steps S1-S6 do not impact users interacting with network 11 significantly. For example, users accessing network 11 over the Internet still interact with the source object and are shielded from the operation of the target object. However, if step S6 confirms the operation of the modified target object, it can then be inserted into the user workflow so that the user interacts with the target object instead of the source object. Thus, the user can benefit from any upgrade or modification implemented on the target object.

Accordingly, step S7 involves switching the target object into the user workflow and switching the source object out of the workflow. This switching can be specified using the graphical interface prior to actual implementation. Typically, this will involve changing logical addresses so that the source object no longer receives the formerly common input and so that the target output can impact the user (directly or indirectly). The switching itself can be invisible to the user, although the user may well experience benefits due to the network upgrade.

While method M1 is described above in the context of a network upgrade, it applies as well to other network modifications. For example, it can be used to implement a downgrade (to improve compatibility or to recover the extra processing resources consumed by a previously installed upgrade). Method M1 can also be used to reallocate resources, e.g., moving an application so as to allot more or fewer resources to it.

Method M1 also provides for adding resources rather than replacing resources. For example, the end result might be that an application formerly running on only one computer is replicated so that it runs in parallel on two computers. In this case, step S7 involves switching in the target object, but not switching out the source object. If this parallel use of a copy-and-paste result occurs frequently, the copy-and-paste operation can be configured to automatically arrange source and target inputs and outputs for parallel operation.

Method M1 can also be used to allow a source object to be taken offline for maintenance or hardware modification. In this case, the source configuration is copied to the target object. Optionally, the resulting configuration can be validated. Then the target object is switched into the user workflow. The source object can be switched out and then powered down (if necessary) without impacting users. Once maintenance and/or hardware modifications can be complete, the original source object and target object can be switched, or the original source object can be reallocated—e.g., made available for future copy-and-paste operations.

In the illustrated embodiment, source input and source output data streams are replicated and a target output is provided by default when the copy and paste is executed. Alternatively, the copy and paste command can exclude provision for these additional data streams. These can then be added manually using the graphical user interface if desired. Other embodiments provide only one or two of the data stream changes, leaving the others to be added manually.

Where there are multiple inputs and outputs to the copy source, the invention provides for default replication of none, some or all of these. For example, Internet inputs and outputs can be replicated, while others (representing internal activity) are not.

Outputs replicated for comparison purposes can be compared in real time or captured for non-real-time comparison. The comparisons can be used to validate a copy-and-paste operation, as well as to evaluate the effect of an upgrade implemented with or after the copy and paste operation.

Where alternatives such as those described above are available, they may be implemented in the alternative, or dependent upon user selection, or upon automatic conditions. These and other variations upon and modifications to the described embodiments are provided for by the present invention, the scope of which is defined by the following claims.

What is claimed is:

1. A network system comprising:
a network having network objects including a source network object and a target network object;
a display for displaying
a source graphical object representing said source network object in a first configuration,
a target graphical object representing said target network object in a second configuration, and
in response to a user initiated copy-and-paste operation in which said source graphical object is the source for a copy portion of said copy-and-paste operation and in which said target graphical object is the target to which a paste portion of said copy-and-paste operation is applied, displaying said target graphical object so that it represents said target network object in a third configuration resulting from applying said first configuration to said target network object in said second configuration;
a comparison function, said source network object having a source output, said target network object having a target output, said display, in response to said copy-and-paste operation, representing potential connections between said comparison function and said source output and between said comparison function and said target output; and
implementation means for implementing said third configuration on said target network object.

2. A network system as recited in claim 1 wherein said comparison function is configured to detect differences between said source output and said target output.

3. A network system as recited in claim 1 wherein:
said source network object has a source input and said target network object has a target input;
said display means being configured to, in response to said copy-and-paste operation, represent said source input and said target input potentially having a common data source.

4. A network system as recited in claim 1 wherein said third configuration is the same as said first configuration.

5. A network system as recited in claim 1 wherein said third configuration is a combination of said first and second configurations.

6. A method of reconfiguring a network having network objects, said method comprising:
displaying a first graphical image of said network in an actual configuration;
in response to a user copy-and-paste operation, displaying a second graphical image corresponding to a potential modification of said network involving, at least in part applying a source configuration of a selected source network object of said network to a selected target network object of said network, representing a source input of said source network object and a target input of said target network object potentially having a common data source for receiving common data, and representing a comparison function with inputs respectively coupled to a source output of said source network object and a target output of said target network object; and in response to a user command, implementing said modification on said network.

7. A method as recited in claim 6 further comprising: after implementing said modification, comparing outputs of said source network object and said target network object using said comparison function.

8. A method as recited in claim 7 wherein said comparing is adapted to detect differences between the outputs of said target network object and said source network object.

9. A method as recited in claim 7 further comprising determining whether or not expected differences between an output of said target network object and said source network object have been realized based on said comparing.

10. A method as recited in claim 6 wherein said implementing involves applying said source configuration to said target network object.

11. A method as recited in claim 6 wherein said displaying involves displaying a first potential modification of said network in which said source configuration is applied to said target network object and then displaying a second potential modification in which said configuration of said target network object is further modified from said first potential modification, said implementing involving implementing said second potential modification and not said first potential modification on said network.

12. A method comprising:

a computer displaying on a display a graphical representation of a network including a source network object having a source configuration and a target network object having a first target configuration, said graphic representation including a source image object representing said source network object in said source configuration and a target image object representing said target network object in said first target configuration;

said computer, in response to a selection of said source image object, automatically selecting said target image object; and said computer, in response to a user-initiated copy-and-paste operation, executing said copy-and-paste operation so that said graphical representation represents a potential modification of said network and said target image object represents said target network object in a second target configuration corresponding to or including said source configuration, said potential modification including connecting respective outputs of said source and target network objects to a comparison function.

13. A method as recited in claim 12 wherein said potential modification includes connecting inputs to said source and target network objects to receive common data.

14. A method as recited in claim 12 further comprising implementation means for implementing said second target configuration on said target network object.

15. A method as recited in claim 14 further comprising comparing data output from said target network object with data output from said source network object.

16. A method as recited in claim 15 wherein said comparing detects differences between the outputs of said target network object and said source network object.

17. A method as recited in claim 15 further comprising determining, based on said comparing, whether expected differences between an output of said target network object and said source network object have been realized.

* * * * *